Figure 1:
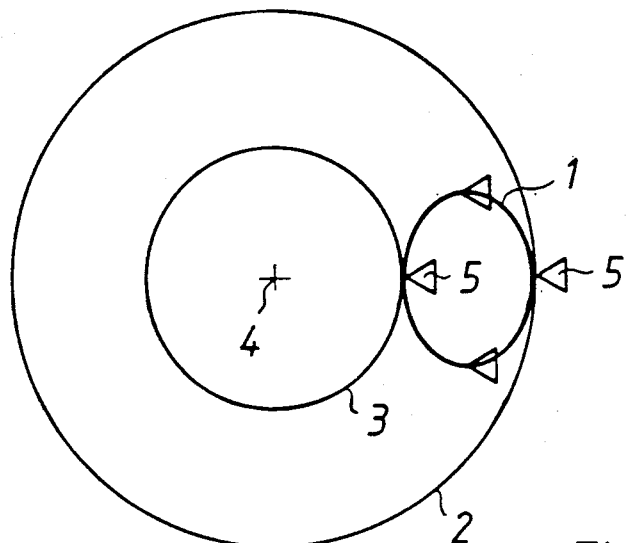

United States Patent [19]

Ley

[11] Patent Number: 4,651,599

[45] Date of Patent: Mar. 24, 1987

[54] METHOD FOR PRODUCING WORKPIECES HAVING POLYGONAL OUTER AND/OR INNER CONTOURS

[76] Inventor: Hans Ley, Dr. Wirtz-Strasse 3, D-5203 Much, Fed. Rep. of Germany

[21] Appl. No.: 718,017

[22] PCT Filed: Jul. 26, 1984

[86] PCT No.: PCT/EP84/00228

§ 371 Date: Mar. 29, 1985

§ 102(e) Date: Mar. 29, 1985

[87] PCT Pub. No.: WO85/00545

PCT Pub. Date: Feb. 14, 1985

[30] Foreign Application Priority Data

Aug. 1, 1983 [DE] Fed. Rep. of Germany ....... 3327681
May 4, 1984 [DE] Fed. Rep. of Germany ....... 3416430

[51] Int. Cl.$^4$ ............................ B23B 1/00; B23B 5/44
[52] U.S. Cl. .......................................... 82/18; 82/1.3; 51/90; 51/97 NC
[58] Field of Search ...................... 82/1 C, 18, 19, 1.3; 51/90, 97 NC, 33 W

[56] References Cited

U.S. PATENT DOCUMENTS 3,593,603  7/1971  Gellert ................................. 82/18
3,886,693  6/1975  Tajnafoi et al. ................. 51/105 EC
3,916,738  11/1975  Neubrand et al. ..................... 82/18
3,958,471  5/1976  Muller .................................... 82/18

FOREIGN PATENT DOCUMENTS 506943   8/1930   Fed. Rep. of Germany .
513327   11/1930  Fed. Rep. of Germany .
2355036  5/1975   Fed. Rep. of Germany .
274321   7/1951   Switzerland .
330925   8/1958   Switzerland .
738771   6/1980   U.S.S.R. .

Primary Examiner—Lowell A. Larson
Assistant Examiner—Jerry Kearns
Attorney, Agent, or Firm—Spencer & Frank

[57] ABSTRACT

Process for fabricating work-pieces with polygonal inner and/or outer profile, preferably by removal machining, wherein the work-piece pivots about a fixed axis (4) at constant speed while the tool (5) defines a closed loop path, wherein the rotation speed of the work piece and the rotation speed of the tool (5) on its path (6) are interdependent and wherein the tool (5) bites on the workpiece throughout its path, wherein the tool follows a closed path (6) differing from a circle and which is traversed by the tool (5) with a displacement speed varying in the course of one path by virtue of a predetermined displacement law, and wherein the path (6) is excentric with respect to the rotation axis (4) of the work piece and surrounds the latter.

8 Claims, 13 Drawing Figures

METHOD FOR PRODUCING WORKPIECES HAVING POLYGONAL OUTER AND/OR INNER CONTOURS

The invention relates to a method for producing workpieces having polygonal outer and/or inner contours, preferably by machining, with the workpiece to be processed rotating at a constant rate around a stationary axis while the tool is guided on a closed curved path. The rate of rotation of the workpiece and the circumferential speed of the tool on its curved path are dependent upon one another and moreover the tool is in engagement with the workpiece during the entire revolution.

DE-OS [German Laid-Open Patent Application] No. 2,355,036 discloses a method of the above-mentioned type in which the tool is guided on an elliptical path with respect to the workpiece. By superposing the rotary motion of the workpiece on the movement of the tool which traverses an elliptical path, corresponding polygonal contours can be produced, even those having sharply defined corners. Drawbacks resulted when the prior art method was reduced to practice, for example a considerable reduction of the operating speeds, since the drive mechanisms for producing the elliptical movement of the tool permit only limited numbers of revolution. A further drawback of the known mode of operation is that the drive mechanism required to produce the law of motion must be constructed with relatively large dimensions and accordingly the production of polygons having different diameters requires the provision of a reduction lever arrangement which is difficult to accomplish with the necessary rigidity. The parameters determinative for the curved path are firmly linked with one another so that only the magnitude of the curved path can be varied by a transmission rod while its shape cannot be changed. A further drawback is that the transmission rod imparts additional "elasticity" to the device which adversely affects dimensional accuracy, particularly in mass production.

It is now the object of the invention to provide a method which permits greater operating speeds and better adjustment possibilities for the individual parameters. Moreover, high precision is to be possible so that precise fits can be produced even in mass production, as they are required, for example, for shaft-hub connections. Additionally, a significantly simplified gear structure is to be possible.

This is accomplished according to the invention in that the tool is guided so as to rotate on a closed curved path which deviates from the circular shape, with such curved path being traversed by the tool at a speed which changes during one revolution according to a given law of motion, and that the curved path is oriented eccentrically with respect to the axis of rotation of the workpiece and encloses this axis. This method has the result that the curved path traversed by the tool does not extend, as in the known methods, between the incircle and the circumcircle of the polygonal profile to be produced, but lies on the circumcircle and thereby encloses the incircle of the polygonal profile to be produced. Since this manner of proceeding permits the predetermination of a curved path which approximately lies in the order of magnitude of the diameter of the polygonal profile to be produced, the resulting pressure angles in principle are more favorable for the tool, which is advantageous particularly for machining work, for example turning. Tool movement in the manner of rotary fly cutting work is likewise possible, i.e. discontinuous tool engagement during one revolution. The advantage of the invention lies in the broad range of possible variations for the curved path.

In a preferred embodiment of the method it is provided that the curved path has the shape of an epicycloid, particularly a Pascal curve. By superposing the rotary movement of the workpiece on a Pascal curve traversed by the tool, preferably in the same sense of rotation, with the Pascal curve being placed, according to the method of the invention, so that it encloses the axis of rotation of the workpiece, suitable selection of the Pascal curve and a correspondingly given ratio of the rate of rotation of the workpiece to the rate of rotation of the tool, it is possible to produce, for example, polygonal contours having essentially linear sides and essentially sharp corners. The pole axis of the Pascal curve defined by the connecting line between the apexes and the pole of the curve, must here orthogonally intersect the axis of rotation of the workpiece. The pole of the curve is then shifted radially with respect to the axis of rotation of the workpiece, with the circumcircle of the polygonal contour to be produced being tangent on the apex of the curve near the pole and the incircle of the polygonal contour to be produced being tangent on the apex of the Pascal curve remote from the pole. By changing the association of the Pascal curve with the axis of rotation of the workpiece, for example by radially shifting the pole of the Pascal curve with respect to the axis of rotation of the workpiece, it is possible to produce a multitude of variations with a given Pascal curve. If the association of the Pascal curve is changed in such a manner that the apex near the pole is tangent on the incircle and the apex remote from the pole is tangent on the circumcircle of the polygonal contour, suitable setting of the parameters permits the production of greatly concave flanks with large corner radii. Such polygonal profiles constitute ideal profile shapes for couplings and shaft-hub connections. The concave flanks result in favorable contact angles and thus not much widening of the hub and the large corner radii, on the other hand, result in a reduction of the notch effect.

Displacements of the Pascal curve in the manner that the incircle and circumcircle of the polygonal contour to be produced are not tangent on the apexes but on other points of the curved path, i.e. rotating the curved path relative to the workpiece, result in asymmetrical polygonal contours depending on the direction of rotation. The selection of the Pascal curve to be employed in each case results from the desired polygonal contour.

If the direction of rotation of workpiece and tool are selected to be opposite to one another, a helical shape of the polygonal contour results in the longitudinal direction of the workpiece corresponding to the set feed.

Another advantageous embodiment of the method according to the invention provides that the curved path is a hypocycloid, particularly an ellipse. Although it is known from the method discussed as state of the art to superpose an elliptic path on the rotation of the workpiece as the curved path for the tool. The ratio of the rate of rotation of the tool to the rate of rotation of the workpiece in the known arrangement corresponds to the number of corners in the polygon. The workpiece here rotates by one period, i.e. from one corner to the next, while the tool performs a full revolution on an elliptic path. With the association of tool path and workpiece according to the invention, wherein the tool path (epicycloid or hypocycloid) encloses the axis of rotation of the workpiece, the difference in the number of revolutions between the rate of rotation of the workpiece and the rate of rotation of the tool corresponds to the number of corners in the polygon. For the tool path on a Pascal curve and on an ellipse, the following applies:

$$E = \frac{1}{\frac{n_2}{n_2} - \frac{n_1}{n_2}}$$

(for $n_2 > n_1$)

or $$E = \frac{1}{\frac{n_1}{n_1}\frac{n_2}{n_1}} - 1$$

(for $n_1 > n_2$)

where E=number of corners, $n_1$=rate of rotation of the workpiece and $n_2$=rate of rotation of the tool.

The association of elliptical paths as the path of the tool with respect to the workpiece provides additional possibilities compared to the Pascal curve because, with respect to the Pascal curve which has symmetry over 180°, the ellipse has symmetry over 90°. In addition to the normal arrangement as described above, i.e. incircle and circumcircle of the polygonal contour to be produced are touched after 180°, elliptical paths can also be arranged in symmetry with the axis of rotation of the workpiece. Compared to the above-described arrangement, polygonal contours are produced which have twice the number of corners. Additionally, by means of appropriate radial displacements on all sides, it is possible to produce irregular polygonal contours which have two incircles and/or two circumcircles.

To produce epicycloids as curved paths for the tool, a preferred embodiment of the invention provides that the tool is guided on a first circular path, preferably at a constant angular velocity with respect to the axis of rotation of this circular path, with the axis of rotation itself rotating in the same sense of rotation but at a higher, preferably constant angular velocity on a second circular path and that, in order to vary the shape of the curved path, the radius of the first circular path and the radius of the second circular path, as well as the phase position of the rotating radii $R_1$ and $R_2$ are freely settable and preferably the radius of the second circular path is smaller than the radius of the first circular path. This method of guiding the tool has substantial advantages over the prior art method since it makes possible the use of drive mechanisms of simpler design which additionally permit the free setting of two parameters, with respect to changing the curved path for the tool, namely the radii of the two circular paths. The particular advantage of this mode of operation is that the epicycloid is produced by superposition of two circular paths without requiring a conventional type planet gear mechanism, which makes possible a simple, compact drive structure. To produce a Pascal curve, the axis of rotation of the circular tool path rotates on the second circular path at twice the angular velocity of the tool. With this superposition, the tip of the tool describes an epicycloid in space according to the set parameters.

In order to produce hypocycloids, particularly ellipses, as the curved path for the tool, another embodiment of the method of the invention provides that the tool is guided on a first circular path, preferably at a constant angular velocity with reference to the axis of rotation of this circular path, with the axis of rotation itself rotating on a second circular path in the opposite sense of rotation at at least the same, preferably constant angular velocity and that, in order to change the shape of the curved path, the radius of the first circular path, on the one hand, and the radius of the second circular path as well as the phase position of the rotating radii $R_1$ and $R_2$ are freely settable. With this superposition, the tool tip describes a hypocycloid in space according to the set parameters.

To produce an ellipse, the axis of rotation of the circular tool path rotates at the same angular velocity as the tool on the second circular path. Compared to the prior art methods, this arrangement also permits a very compact, simple drive mechanism design since it has a multitude of possible variations.

The invention further relates to an apparatus for producing workpieces having a polygonal outer and/or inner contour by means of a rotatably mounted, driven workpiece receptacle and a tool which is guided along a closed curved path and is in engagement with the workpiece during the entire revolution. The tool is in communication with the drive of the workpiece receptacle, particularly in order to implement the method according to the invention.

The apparatus according to the invention is characterized by a driven crank arm which is rotatably mounted in a frame and whose crankpin is connected with a bearing so as to be adjustable with respect to its distance $R_2$ from the crankshaft. The apparatus further includes a tool holder and tool receptacle which are connected with the bearing so as to be rotatable about an axis of rotation disposed parallel to the crankshaft, with the distance $R_1$ of the tool receptacle from the axis of rotation of the tool carrier being adjustable, as well as drive means for driving tool carrier and crankarm with respect to direction of rotation, angular velocity and mutual phase position in dependence on one another, and an adjustment device connected with the frame for setting the radial distance on all sides and/or the orientation of the axis of rotation of the crankarm with respect to the axis of rotation of the workpiece. This arrangement results in a very compact drive structure with free adjustability of the path radius of the bearing on the one hand and of the path radius of the tool receptacle on the other hand. The shape and size of the respectively desired curved path for the tool itself can be set at will so that polygonal profiles can be produced over a large diameter range.

Advisably a change gear system is provided as the drive means. This now makes it possible to give, in this device, the ratio of rotation of the tool carrier on the one hand and of the crank on the other hand depending on the required polygonal contour. A further advantage is that with an appropriately designed change gear system, the direction of rotation of tool carrier with respect to the crankarm can also be changed so that it is possible with the same device to predetermine an epicycloid, for example Pascal curves, or a hypocycloid, for example ellipses, as the curved path for the tool. With the setting device connected with the frame, it is additionally possible to set the eccentricity of the curved path of the tool with respect to the axis of rotation of the workpiece. With parallel orientation of the axis of rotation of the tool holder with respect to the workpiece axis, polygons result which have parallel surface lines. The device is additionally provided with a feeding device which makes it possible to displace the tool in the longitudinal direction, i.e. in the direction of the axis of rotation of the tool receptacle.

Instead of a gear drive, two individual motors can also be provided for the superposed rotary movements of crankarm and tool holder, with these motors being coupled with one another with respect to their sense of rotation, number of revolutions and phase position of the associated components (workpiece, crankarm and tool holder) so as to be dependent upon one another.

To produce conical workpieces or workpieces which are profiled in the longitudinal direction and have a polygonal cross section, the apparatus is provided with additional devices which, during operation, adjust radius $R_1$ and, if necssary, the eccentricity and/or radius $R_2$ corresponding to the desired cone angle.

In addition to the production of regular polygonal profiles for which the stated formulas apply, completely irregular polygonal contours which, however, are closed in themselves can also be produced by suitable selection of the translatory relationships.

To produce workpieces having polygonal contours which are helical in the longitudinal direction, a translation ratio must be selected between workpiece rate of rotation and tool rate of rotation which, depending on the desired pitch of the helix and the selected feed in the longitudinal direction, deviates from the ratio corresponding to the desired number of corners. With appropriate selection of the parameters, polygonal helixes with the corresponding pitch result even if workpiece and tool rotate in the opposite sense. By correspondingly selecting the translation ratio between workpiece and tool rotation, polygonal contours can also be produced which overlap one another, so that by repeatedly rotating the workpiece with discontinuous engagement or by arranging a plurality of tools corresponding to the number of corners in the profile on the tool holders, as is known for fly cutting machines, the core of the respective polygonal contour results as the workpiece contour. Coupling between workpiece receptacle and tool may be effected by means of gears having the corresponding gear ratio and a back gear shaft. Electronic coupling is likewise possible. It offers the advantage of being able to infinitely set any desired transmission ratio with relative ease, particularly for the production of helical workpieces.

One feature of the apparatus according to the invention provides that the drive mechanism is a gear drive whose driving gear is fixed to the crankpin and drives at least one intermediate gear which is mounted at the preferably parallel guided bearing flange and that the intermediate gear is in communication with a driven gear which is fixed to the shaft of the tool holder. This configuration permits the use of a relatively large bearing flange which offers a sufficiently large amount of space to accommodate change gears. Parallel guidance can be effected, for example, by means of a parallel guide rod. Mass compensation is simple since only rotating masses need be considered.

In another embodiment of the apparatus according to the invention it is provided that the shaft of the crank arm is a hollow shaft through which passes a drive shaft which is connected with the shaft of the tool holder and the hollow shaft and the drive shaft are mounted in the frame which is connected with the adjustment device for radially setting the eccentricity on all sides and/or aligning the axis of rotation of the tool holder with respect to the axis of rotation of the crankarm and that gears are provided to set, with respect to the drive shaft and the hollow shaft, a ratio of rpm and sense of rotation of the tool holder shaft on the one hand and the hollow shaft on the other hand, depending on the desired curved path of the tool. Such a configuration results in a very compact structure which is suitable particularly as an accessory device for lathes and which is even better manageable with respect to mass compensation since all components perform only one rotary movement.

Further advantageous embodiments are defined in claims 7 and 8.

In a further embodiment of the invention, measures are provided to simultaneously produce, by reducing the components, a reduction of masses to be moved, it being particularly important in this connection to eliminate translatorily moved masses to thus realize, due to simplification of the balancing process, even greater operating speeds.

This is accomplished according to the invention in that the drive means is a gear drive whose driving gear is fixed to the crankshaft and drives at least one intermediate gear mounted at a bearing flange and that the intermediate gear drives a second crankshaft arranged parallel to the first crankshaft, with the crankarm of the second crankshaft having the same length as the crankarm of the first crankshaft and a driving gear is fixed to the crankpin of the second crankshaft so as to be in engagement with a driven gear connected with the rotary shaft of the tool holder. This arrangement has the advantage that the curved path described by the tool tip can be produced by superposing a rotary movement and all translatorily moved components, particularly the corresponding parallel guide rod system can be omitted. Such a configuration is not only more easily balanced, it also has the advantage that most of the bearings are disposed in a fixed frame and the number of rotary bearings which must be guided on a circular path is reduced to a single bearing with the immediate result of improving the manufacturing accuracy of the polygonal contours to be produced.

In one embodiment of the invention it is provided that the gear drives and the driving gear at the second crank and the associated driven gear at the rotary shaft of the tool holder are designed in such a manner that the first crankshaft and the rotary shaft rotate in opposite directions and at preferably the same number of revolutions. The tool tip here describes a hypocycloid. With the parameters given accordingly, a hypocycloid in the form of an ellipse is produced at the same number of revolutions.

In another embodiment of the invention it is provided that the gear drive and the driving gear at the second crank and the driven gear at the rotary shaft of the tool holder are designed in such a manner that the first crankshaft rotates in the same sense of rotation as the rotary shaft and at twice the number of revolutions. In this arrangement, a Pascal curve is produced as the curved path for the tool tip. With the given association of tool path and workpiece, in which the path of the tool (epicycloid or hypocycloid) encloses the axis of rotation of the workpiece, the difference in rpm between the rate of rotation of the workpiece and the rate of rotation of the tool corresponds to the number of corners of the polygon according to the formulas and the associated explanations.

In order to produce epicycloids as curved paths for the tool, the tool is guided on a first circular path, preferably at a constant angular velocity with respect to the axis of rotation of this circular path, with the axis of rotation itself rotating in the same sense of rotation but at a greater, preferably constant, angular velocity, on a second circular path, and, in order to vary the shape of the curved path, the radius of the first circular path and the radius of the second circular path as well as the phase position of the rotating radii $R_1$ and $R_2$ are freely settable and preferably the radius of the second circular path is smaller than the radius of the first circular path.

This method of tool guidance has considerable advantages compared to the prior art methods since it permits the use of drive mechanisms having a simpler configuration which, additionally, permit, with respect to varying the curved path for the tool, the free adjustability of two parameters, namely the radii of the two circular paths. The particular advantage of this mode of operation is that the epicycloid is produced by superposing two circular paths without requiring a conventional planet gear drive for this purpose, thus permitting a simple, compact drive configuration. To produce a Pascal curve, the axis of rotation of the circular tool path rotates on the second circular path at twice the angular velocity of the tool. With this type of superposition, the tool tip describes an epicycloid in space corresponding to the setting of the parameters.

To produce hypocycloids, particularly ellipses, as the curved path for the tool, the tool is guided on a first circular path, preferably at a constant angular velocity with respect to the axis of rotation of this circular path, with the axis of rotation itself rotating in the opposite direction on a second circular path at at least the same, preferably constant, angular velocity and, in order to vary the shape of the curved path, the radius of the first circular path, on the one hand, and the radius of the second circular path and the phase position of the rotating radii $R_1$ and $R_2$ are freely settable. With this type of superposition, the tool tip describes a hypocycloid in space corresponding to the setting of the parameters.

To produce an ellipse, the axis of rotation of the circular tool path rotates at the same angular velocity as the tool on the second circular path. This arrangement as well permits a very compact, simple drive configuration compared to prior art methods, with a multitude of possible variations.

Figure 2:
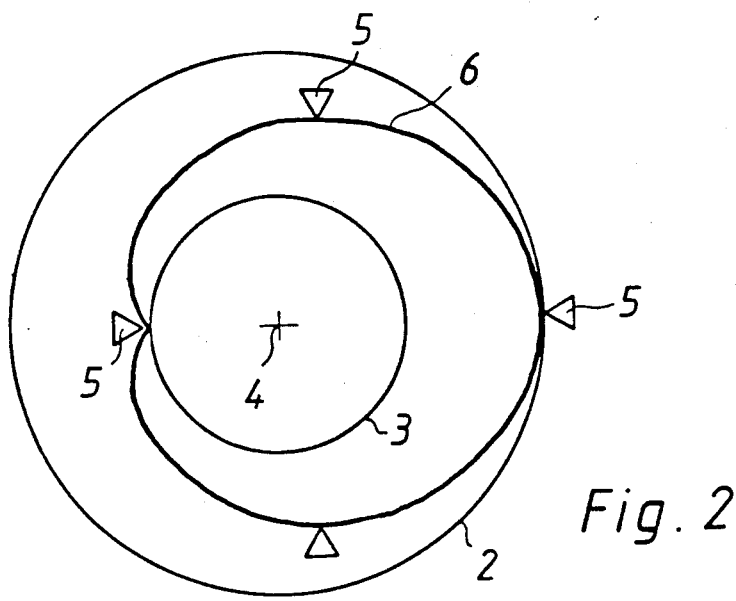
Figure 3:
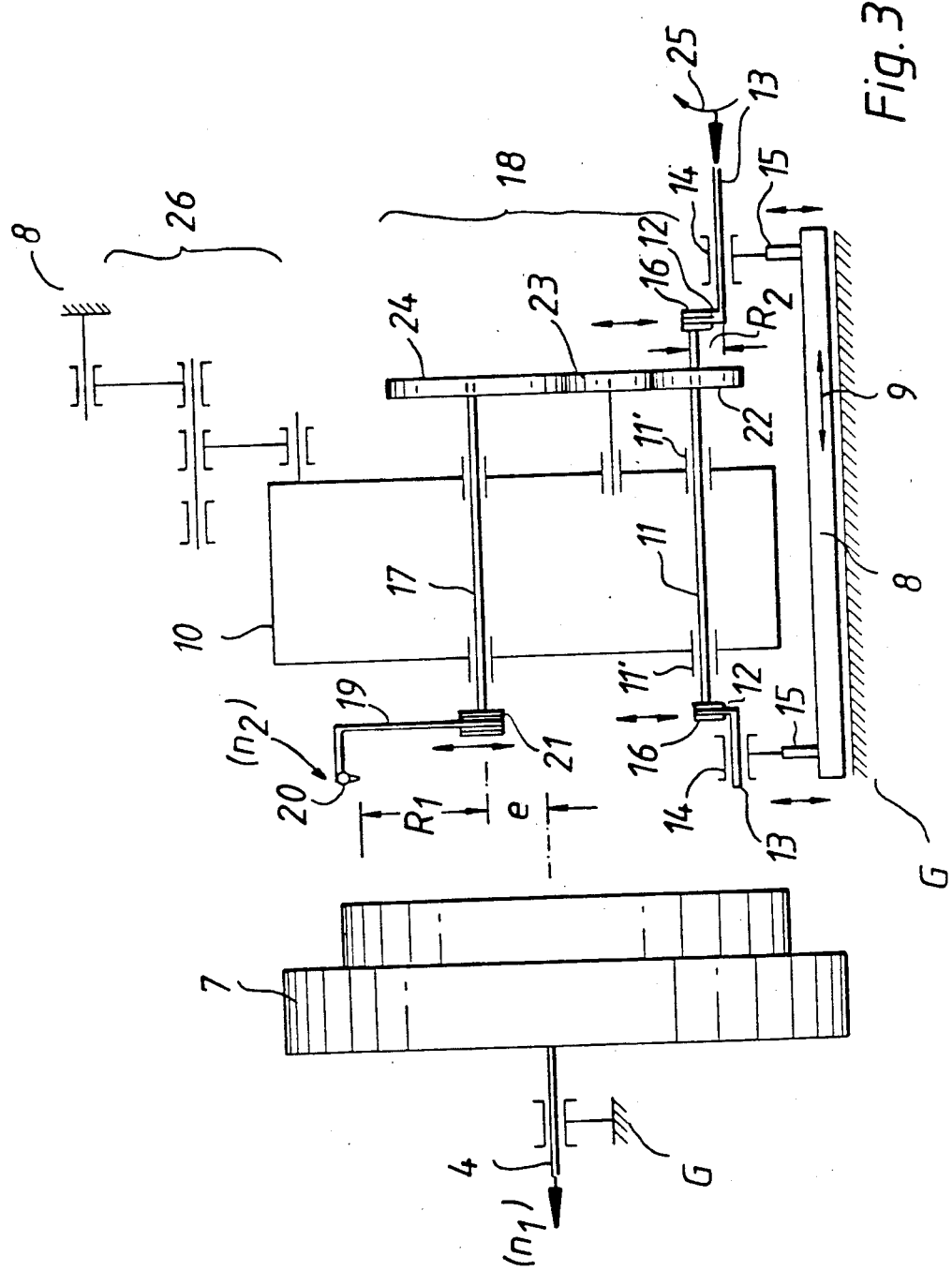
Figure 4:
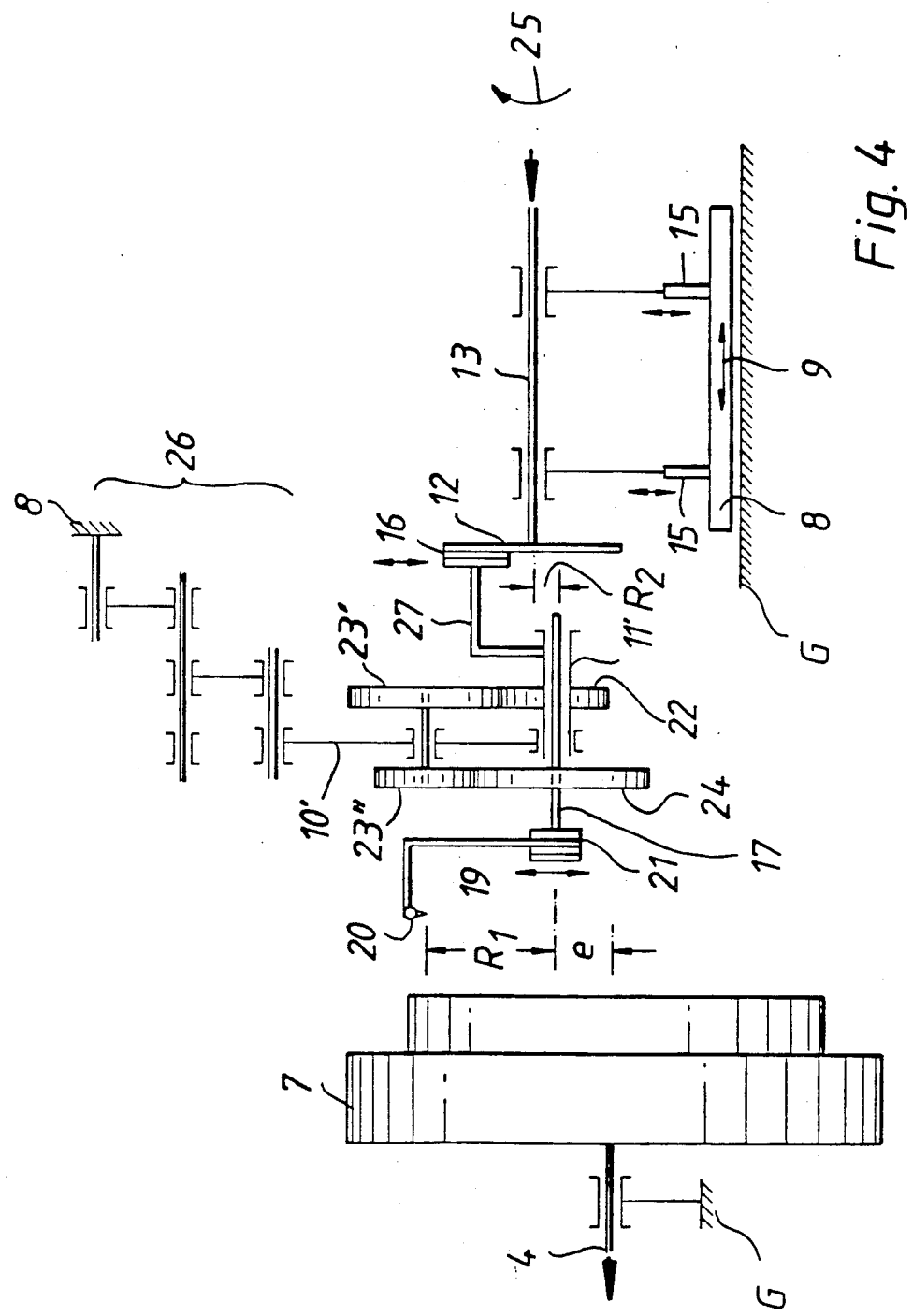
Figure 5:
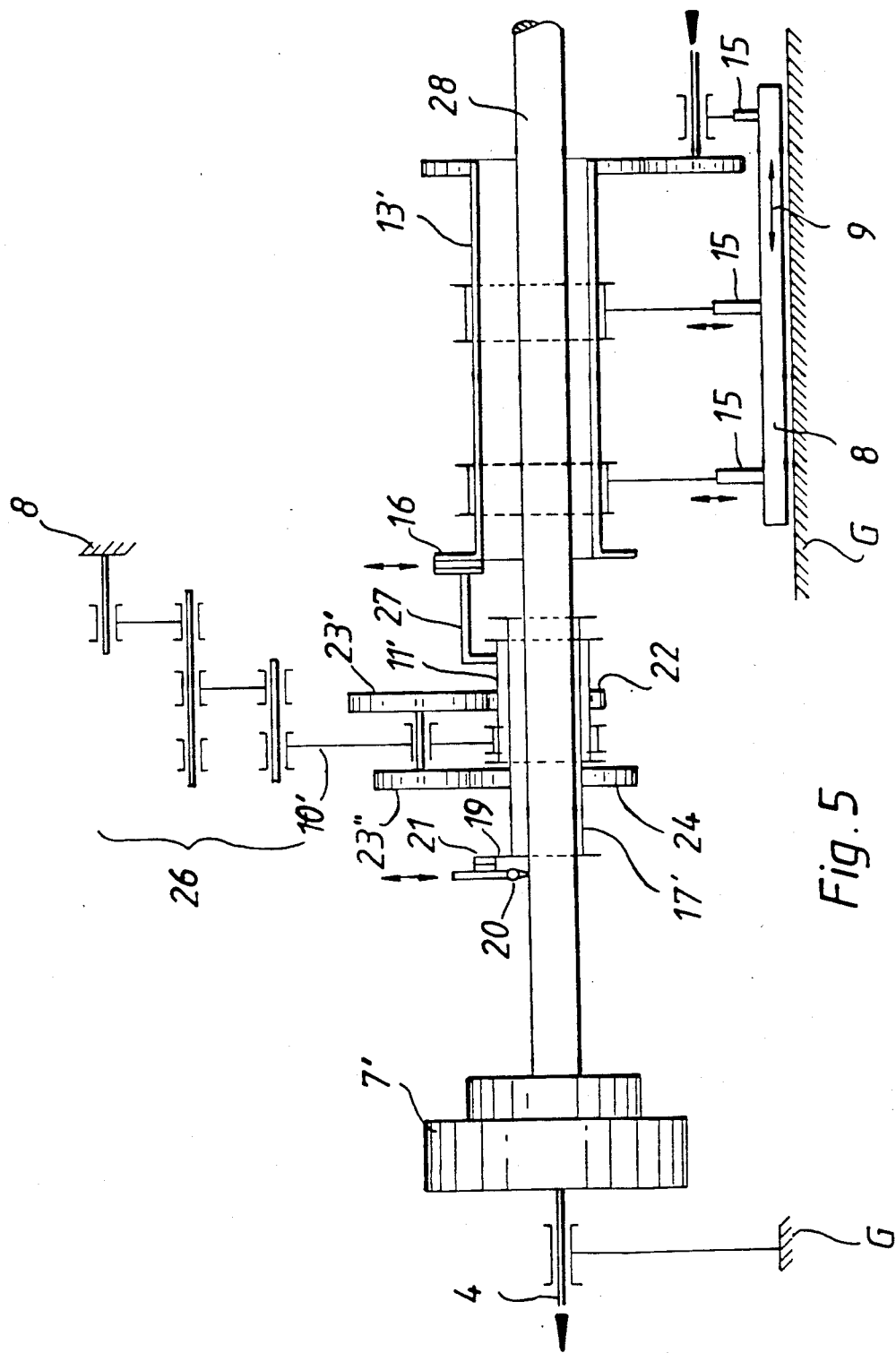
Figure 6:
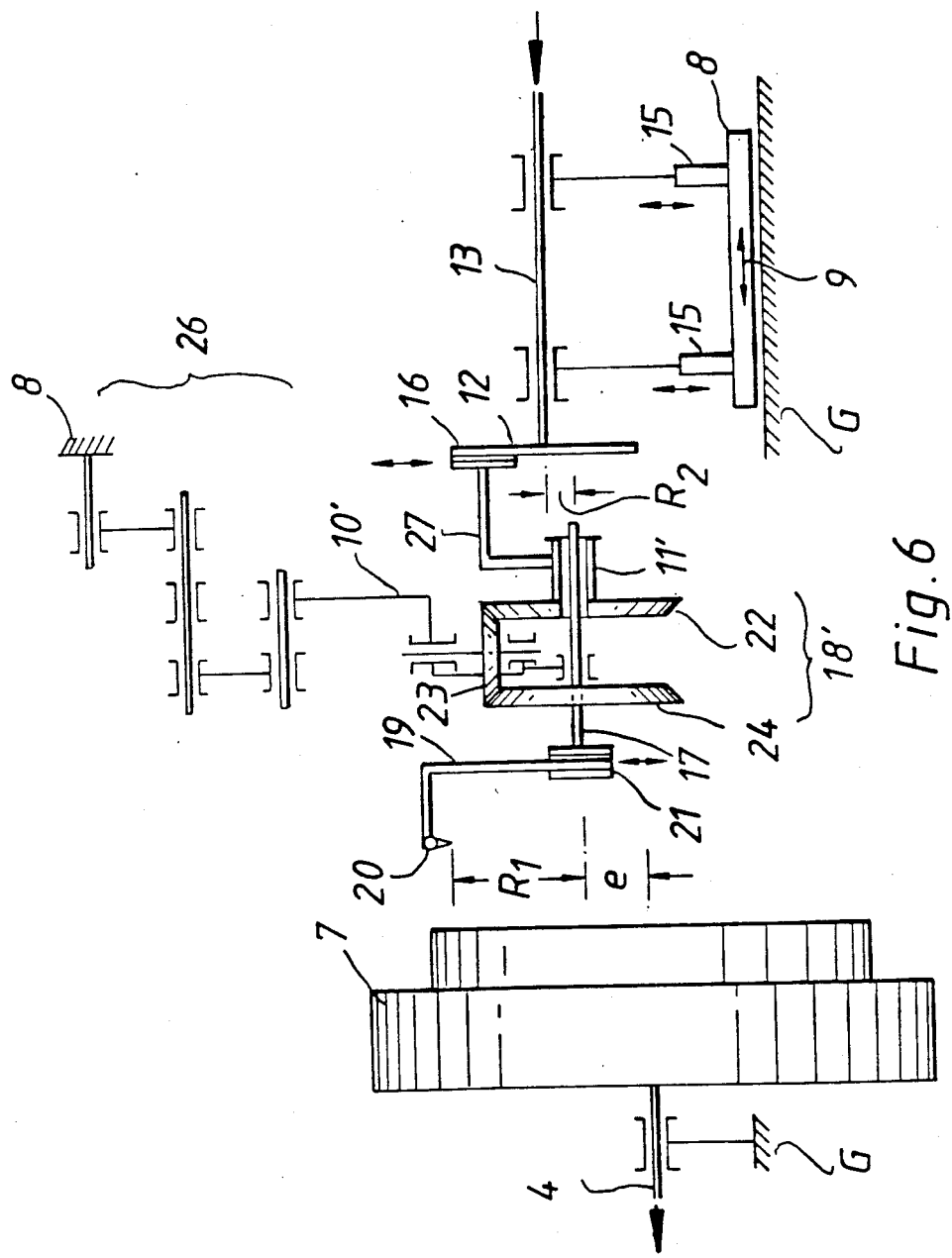
Figure 7:
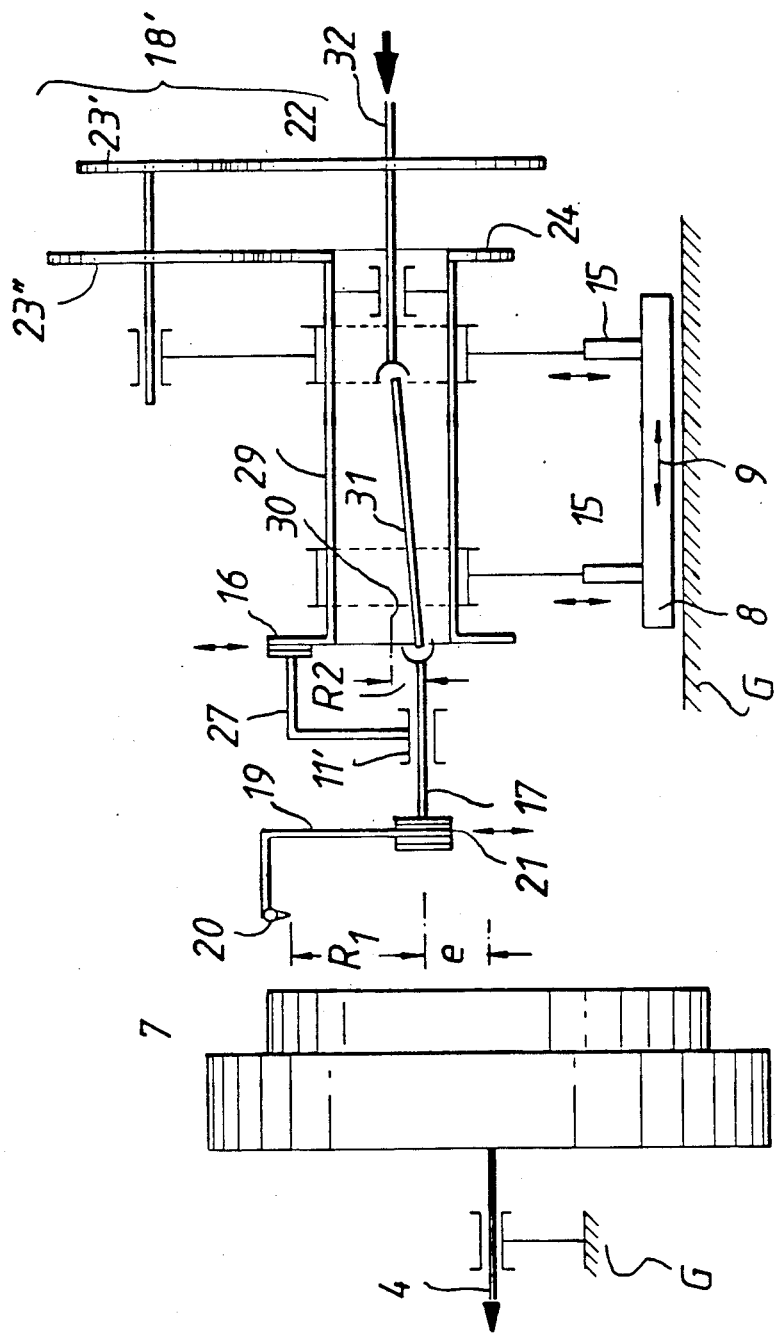
Figure 8:
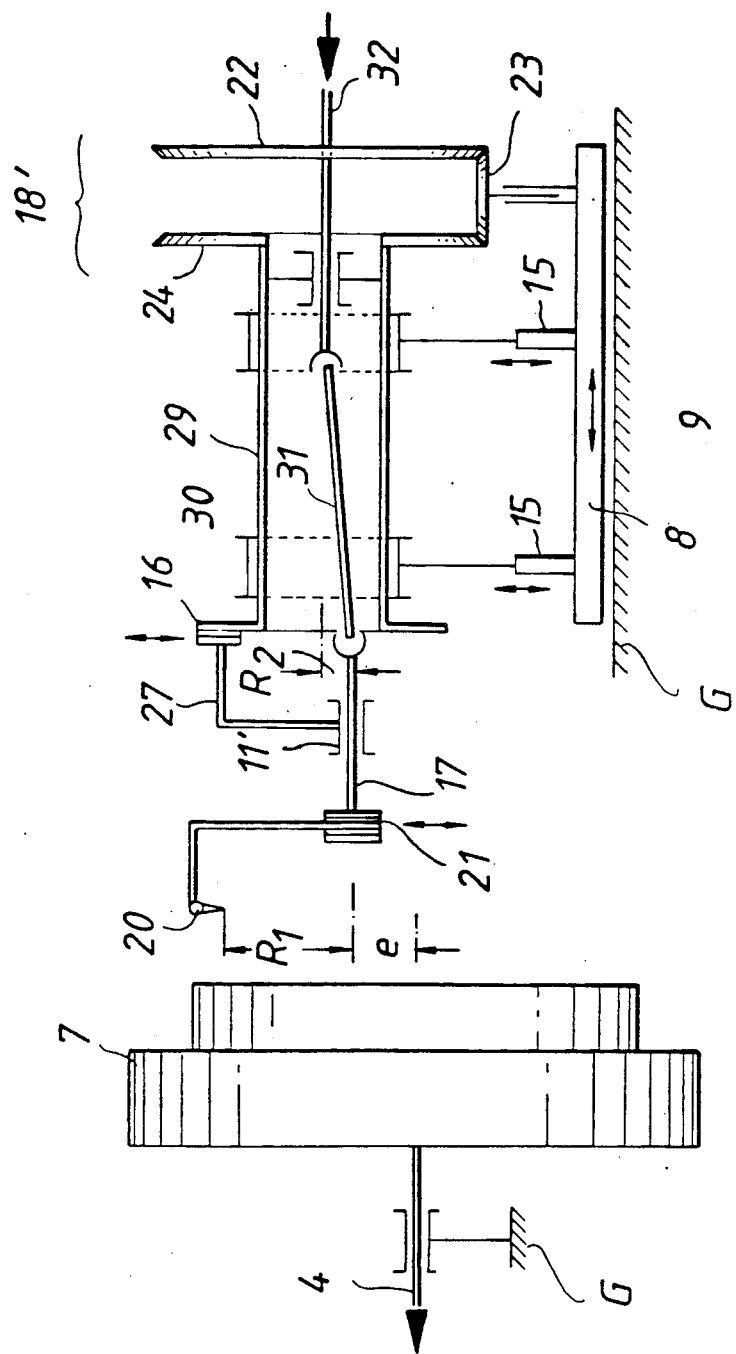
Figure 9:
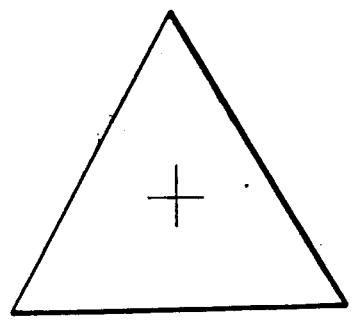
Figure 10:
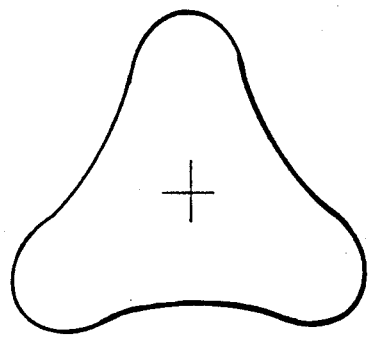
Figure 11:
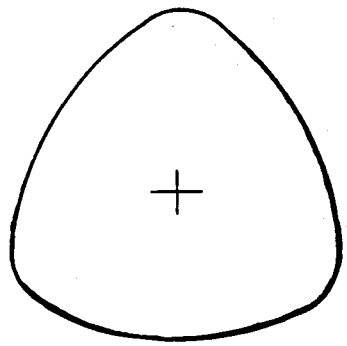

The invention will now be explained in greater detail with the aid of schematic illustrations. It is shown in:

FIG. 1, the position of circumcircle and incircle of a polygonal contour to be produced as well as the position of the tool path with respect thereto according to the prior art methods;

FIG. 2, the position of circumcircle and incircle of a polygonal contour to be produced as well as the position of the tool path with respect thereto according to the method of the invention;

FIG. 3, an apparatus for implementing the method;

FIG. 4, another embodiment of an apparatus in which the tool traverses an epicycloid path;

FIG. 5, an embodiment corresponding to FIG. 4 for the production of long, profiled rods;

FIG. 6, an embodiment of an apparatus in which the tool traverses a hypocycloid path;

FIGS. 7 and 8, embodiments in compact configuration for epicycloid and hypocycloid paths of the tool, respectively;

FIGS. 9, 10 and 11, "triangular" polygonal profiles with differently set parameters.

Figure 12:
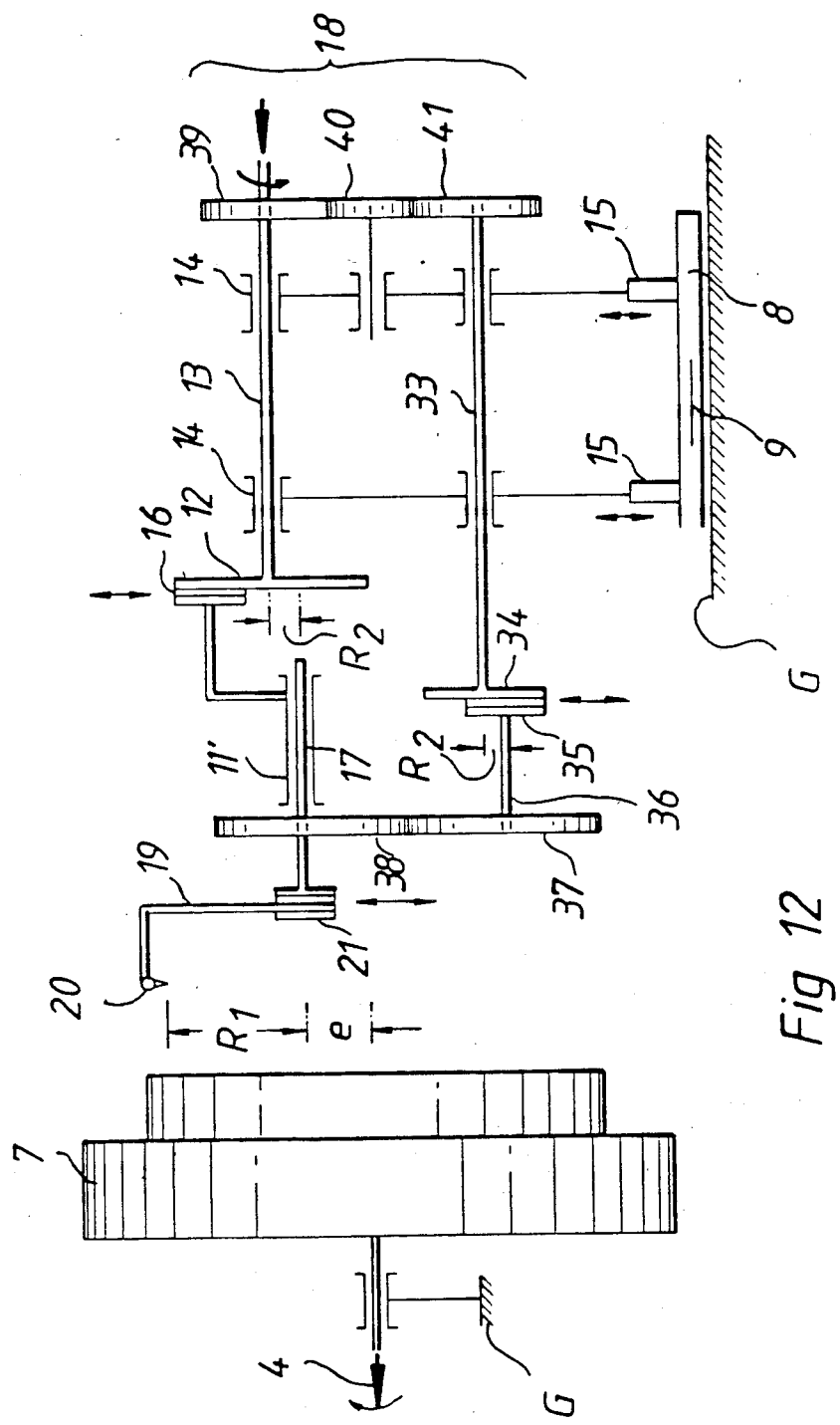
Figure 13:
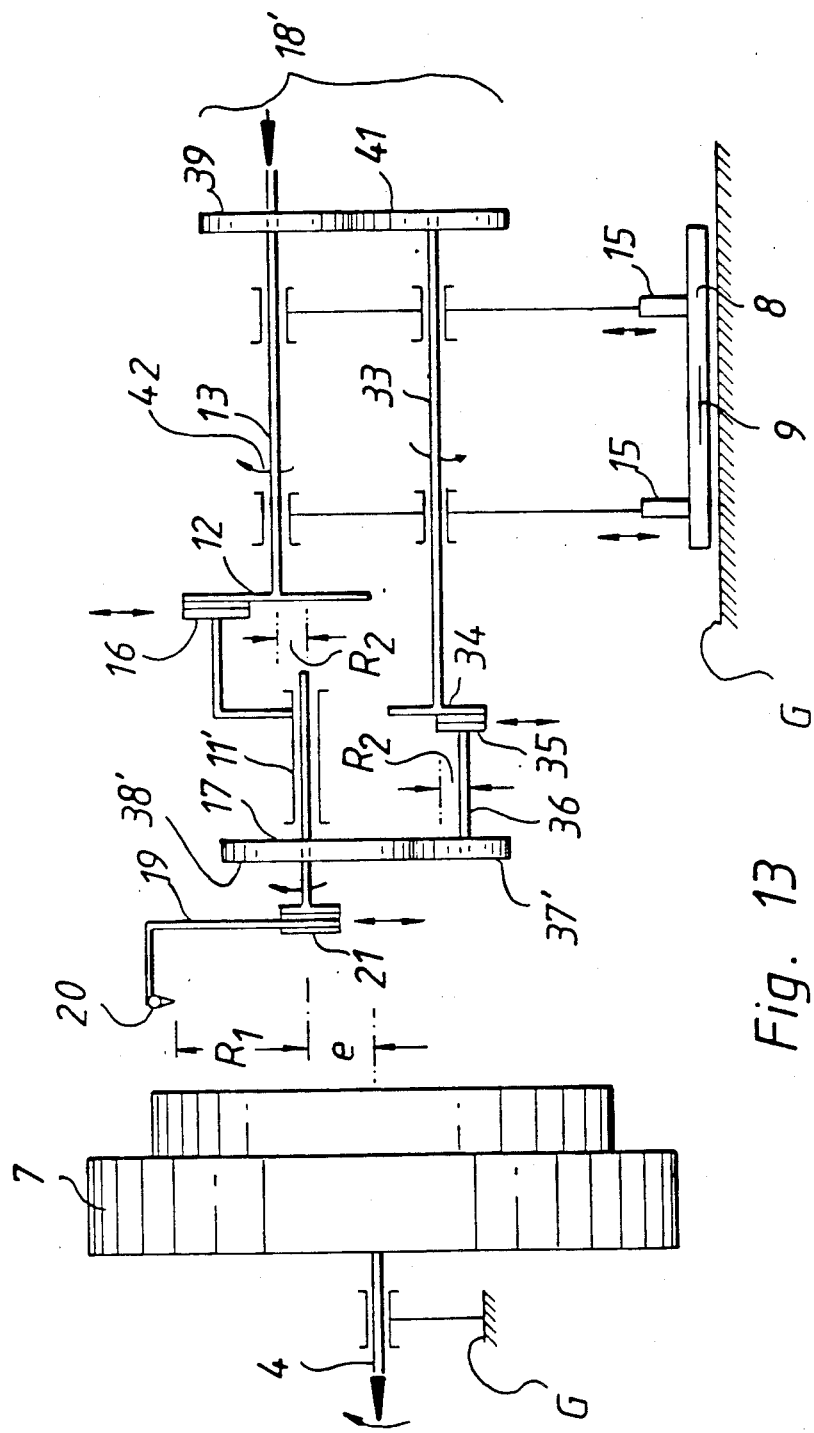

FIG. 12, an embodiment where the curved path traversed by the tool is a hypocycloid;

FIG. 13, an embodiment where the curved path traversed by the tool is an epicycloid.

FIG. 1 is a schematic representation of the association of the tool path 1 with the circumcircle 2 and the incircle 3 of a polygonal profile to be produced according to the prior art methods. The shape of the polygonal contour to be produced is without significance in this connection since only the position of the tool path need be explained. In the known methods, this is an ellipse. This elliptical path touches the circumcircle and the incircle and presumes that tool 5, here indicated symbolically as a tip, is guided in a translatory manner so that during its revolution on tool path 1 the tool tip remains oriented approximately toward the axis of rotation 4 of the workpiece during its revolution on tool path 1, and thus the tool is in engagement with the workpiece, although with changing pressure angle. The axis of rotation 4 of the workpiece is simultaneously the center axis of the polygonal profile to be produced.

FIG. 2 shows in the same manner the method according to the invention. The method is designed in such a way that the tool 5 rotates on a tool path 6 which is tangent on circumcircle 2 but encloses and is tangent on incircle 3 including the axis of rotation 4 of the workpiece so that ultimately a tool path results whose "diameter" is considerably larger than was possible with previous methods. Curved path 6 according to the invention is either an epicycloid, particularly a Pascal curve, as shown, or a hypocycloid, particularly an ellipse. For reasons of presenting it in the drawing, the illustrated Pascal curve is shown somewhat distorted. In practice, the curve is not so greatly defined. In the illustrated curved path 6, with the appropriate ratio of rate of rotation of the workpiece to rate of rotation of the tool, a triangular polygonal profile results which has concave flanks as shown in FIG. 10. If the appropriate apparatus is set so that curved path 6 is rotated by 180° and is associated with circumcircle 2 and the rate of rotation ratio is the corresponding one, a "triangular" polygonal contour results which has essentially sharply drawn corners and linear flanks, as shown in FIG. 9.

The mode of operation of the method according to the invention, i.e. the production of the curved path to be traversed by the tool will be explained in greater detail with the aid of the apparatus shown in FIG. 3. The apparatus is composed of a chuck 7 for the workpiece (not shown in detail here) to be worked. Chuck 7 is in communication with a drive and rotates about rotation axis 4 of the workpiece at a given, constant angular velocity. Similarly as in a lathe, chuck 7 has an associated supportlike frame 8 which is mounted so as to be displaceable, with respect to the machine frame G (not shown in detail here) in which rotation axis 4 is mounted, in the direction of arrow 9 toward chuck 7 and thus toward the workpiece. A bearing 11' is disposed on this frame 8 and is held at one end by the crankpin 11 of a crankarm 12 which is mounted in frame 8 and is part of a bearing flange 10. Shaft 13 of crankarm 12 is in communication with the drive of chuck 7, by way of a drive system not shown in detail here, so that the number of revolutions of shaft 13 depends on the number of revolutions of chuck 7. In the illustrated embodiment, the crank arrangement is mounted at two sides for reasons of stability. Bearings 14 of shaft 13 are held at frame 8 by means of adjustment devices 15 so that bearing flange 10 as a whole can be displaced radially to all sides, particularly transversely to the axis of rotation 4 of chuck 7.

Crankarm 12 is further provided with adjustment means 16 so that crank radius $R_2$ can be varied. A shaft 17 is further mounted in bearing support 10 and is in communication with the crankpin by means of a gear drive 18. Function and mode of operation of this gear drive will be described in greater detail below. On its side facing away from gear drive 18, shaft 17 is provided with a tool holder 19 whose free end has a tool 20 fastened to it. With the aid of an adjustment device 21, the distance of the tool from the rotation axis of shaft 17 and thus radius $R_1$ of the circular path described by the tool with respect to shaft 17, can be varied.

The illustrated drive 18 is designed in such a manner that a gear 22 is fixed on crankpin 11 and has an associated gear 23 which is mounted in bearing flange 10 so as to be freely rotatable. Gear 23 is in communcation with a gear 24 fastened to shaft 17 so that, when crankshaft 13 is rotated in the direction of arrow 25, shaft 17 is given the same direction of rotation. However, gears 22 and 24 are designed in such a manner that shaft 17 rotates at a lower number of revolutions than crankshaft 13.

The end of bearing flange 10 facing away from crankshaft 13 is held at frame 8 by means of a parallel guide rod 26 which is shown only schematically here. If now crankshaft 13 is driven in the direction of arrow 25, each point of bearing flange 10, i.e. also shaft 17, describes a circular path with radius $R_2$. Since simultaneously shaft 17 is also driven by means of drive mechanism 18, tool 20 describes a circular path with radius $R_1$ with respect to shaft 17. In the illustrated and described drive arrangement, the superposition of these two circular movements produces an epicycloid with respect to space, i.e. with respect to chuck 7, in the present case a Pascal curve. With appropriate matching of the number of revolutions $n_1$ of the workpiece and the number of revolutions $n_2$ of the tool, as results from the superposition of the two circular paths, the superposition of the rotary movement of the workpiece in chuck 7, on the one hand, on the rotary movement of tool 20, on the other hand, produces a polygonal contour having the corresponding number of corners, as given by the formulas, above. The shapes of the flanks between the corners, i.e. linear flanks with sharply defined corners, concave flanks with rounded corners or convex flanks with rounded corners, results from the setting of the remaining parameters, as will be described in greater detail below.

If, instead of an epicycloid, i.e. a Pascal curve, a hypocycloid, for example an ellipse, is given as the curved path for tool 20, a relatively simple change in drive mechanism 18 can accomplish this in the above-described apparatus. For this purpose, it is merely necessary to completely eliminate gear 23 and to provide gears 22 and 24 with the same number of teeth, i.e. the same diameter. In this case, shaft 17 rotates in the opposite direction of crankshaft 13 but at the same speed. Tool 20 then describes an ellipse in space which again, when superposed on the constant rotary movement of the workpiece held in chuck 7, and with the remaining parameters given appropriately results in a polygonal contour. The selected shape of the bearing flange here permits the configuration of drive 18 in the form of a change gear drive which is customary in machine tool construction. Since this technique is known to the person skilled in the art, it need not be illustrated or explained in detail here.

FIG. 4 shows another embodiment of an apparatus which permits a substantially more compact configuration than the embodiment of FIG. 3. Insofar as parts are present which correspond in structure and function to those of the embodiment of FIG. 3, they are given the same reference numerals as in FIG. 3. This apparatus as well, has a chuck 7 which is mounted so as to be rotated and driven on a machine frame G which is not shown in detail here. This machine frame G is provided, in the manner of a support, with a frame 8 in which a crankshaft 13 is mounted whose crankarm 12 supports, by way of an adjustment device 16, a bearing 11'. Bearing 11' here simultaneously forms the crankpin which is again radially adjustable by way of a connecting element 27 and a corresponding adjustment device 16. The crank radius $R_2$ can again be set as determined by the adjustment device.

Another gear 22, which has associated gears 23' and 23", is again fastened to the crankpin which is essentially configured as a bearing 11' and this gear is likewise mounted in a bearing flange 10', with gear 23" being in communication with a gear 24 that is fastened to a shaft 17 in which bearings 11' which form crankpin 11 are rotatably mounted. One end of bearing flange 10' is again held, by way of a parallel guide device 26, at a support-like frame 8 so that a translatory circular movement results for bearing flange 10' with respect to the motion enforced by crank 12.

If crankshaft 13 is rotated in the direction of arrow 25, shaft 17 rotates at a lesser speed but in the same direction of rotation as crankshaft 13 so that tool 20 fastened to tool holder 19 again describes a circular path with a radius $R_1$ with respect to shaft 17 and, due to the superposition of the two circular movements in space, this is again an epicycloid, here a Pascal curve.

Adjusting means 16 and adjusting device 21 can again be used to set radius $R_2$ and radius $R_1$, while adjustment device 15 serves to set the eccentricity between the axis of rotation 4 of the workpiece and crankshaft 13. In the embodiments according to FIGS. 3 and 4 it is possible, due to the displaceability of support-like frame 8 in the direction of arrow 9, to produce cylindrical bodies having polygonal cross sections and limited lengths. The embodiment according to FIG. 4, however, permits a structural modification which also makes it possible to process rod material and thus to produce profiled rods having polygonal cross sections. Since the basic configuration corresponds to the embodiment of FIG. 4, the same components are here given the same reference numerals. The significant difference of the embodiment of FIG. 5 compared to the embodiment of FIG. 4 is that crankshaft 13', on the one hand, and tool holder shaft 17', on the other hand, are constructed as hollow shafts so that the rod material 28 to be worked can be brought through the device and through the correspondingly configured chuck 7' in a continuous manner.

Crankshaft 13' which is a hollow shaft is again followed by a connecting piece 27 that supports the crankpin, here configured as a bearing 11' which itself is again mounted in a bearing flange 10' provided with a parallel guide rod 26. Bearing 11' is again connected with a gear 22 and with corresponding gears 23', 23", with gear 23"

cooperating with a gear 24 which is fastened on tool holder shaft 17' in the form of a hollow shaft. Hollow shaft 17' is again provided with a tool holder 19 and an adjustment device 21 for tool 20. Crankshaft 13', in the form of a hollow shaft, is again mounted, by way of adjusting devices 15, in a support-like frame 8, with frame 8 being again mounted on machine frame G so as to be displaceable in the direction of arrow 9.

FIG. 6 shows a modification of the embodiment of FIG. 4, including a drive mechanism 18' for producing curved tool paths corresponding to hypocycloids. Since the basic structure of the device of FIG. 6 corresponds to the device described in connection with FIG. 4, the same components are given the same reference numerals here, so that reference can be made to the description of FIG. 4. The only difference is the configuration of drive mechanism 18' which here is a bevel gear drive, with a direction of rotation opposite to that of gear 22 but at the same angular velocity being imparted to gear 24 which is disposed on shaft 17 by way of intermediate gear 23 which is mounted in bearing flange 10'. Due to the superposition of the two rotation circles with radius $R_2$ and radius $R_1$, with respect to crankshaft 13 and shaft 17, respectively, a curved path corresponding to an ellipse results in space for tool 20.

FIGS. 7 and 8 show further embodiments of an apparatus, with the apparatus according to FIG. 7 being designed to produce tool paths in the form of Pascal curves while the embodiment according to FIG. 8 is designed to produce tool paths which correspond to hypocycloids, in particular ellipses. In the embodiment of FIG. 7, a hollow shaft 29 is again mounted in a support-like frame 8 which is provided with adjustment devices 15. The end of hollow shaft 29 f ing chuck 7 is provided with a "crankpin" 11' which is connected, by way of a connecting element 27, with hollow shaft 29. The "crank radius" $R_2$, which "crankpin" 11' describes around center axis 30 of hollow shaft 29, is again settable with the aid of an adjusting means 16 disposed between connecting element 27 and hollow shaft 29. A shaft 17 is mounted in crankpin 11' and supports, by way of an adjusting device 21, a tool holder 19 with a tool 20. Shaft 17 is in communication, by way of a propellor shaft 31, with a drive shaft 32.

A gear drive 18' is provided whose gears 22, 23', 23'' and 24 drive hollow shaft 29, with hollow shaft 29 rotating in the same direction of rotation but at a higher rate of rotation than drive shaft 32. In this gear arrangement as well, shaft 17 describes a circle with a radius $R_2$ and tool 20 describes a circle with a radius $R_1$ with respect to shaft 17 so that, due to the superposition of these two circular movements, the tool describes a Pascal curve in space.

The embodiment according to FIG. 8 corresponds in its configuration to the embodiment of FIG. 7. The only modification is the design of drive mechanism 18' which here is a bevel gear drive with driving gear 22 and driven gear 24 having the same diameter so that, if driven by way of shaft 32 and intermediate gear 23, the hollow shaft has the same rate of rotation but the opposite direction of rotation as drive shaft 32. The remaining components correspond to the embodiment of FIG. 7 so that a further description is unnecessary. With the above-described devices it is now possible to produce a multitude of polygonal contours, with the free settability of the individual parameters, e.g. the radii $R_1$ and $R_2$ of the circles, and shifting of the total arrangement with respect to axis of rotation 4 of the workpiece and setting of the rate of rotation providing a multitude of possible variations. The adjustment possibility will be explained in greater detail with the aid a "triangular" polygonal cross section.

To produce the polygon shown in FIG. 9 with approximately linear sides and sharply defined corners, a Pascal curve is selected as the curved path for the tool so that one of the devices according to FIGS. 3, 4, 5 and 7 can be used for this purpose. The rotation ratio between the rate of rotation $n_1$ of the workpiece and the rate of rotation $n_2$ of the tool is set, according to the formula for $n_1 < n_2$ so that the number of corners $E = 3$ results. If the circumcircle has a radius of 120 mm, radius $R_1$ of the first circular path, i.e. the path of the tool, must be set to 90 mm. The radial distance between the axis of rotation 4 of chuck 7 and the axis of rotation 13 of the second circular path is set at 33 mm and the radius $R_2$ of the second circular path, i.e. the distance between crankpin 11 and crankshaft 13, is set at 3 mm. With such a setting, the above-stated devices can produce a polygonal contour according to FIG. 9. The apex of the Pascal curve near the pole here is tangent on the circumcircle. If, with the setting otherwise unchanged, the radial distance between the axis of rotation 4 of chuck 7 and the axis of rotation 13 of the second circular path is enlarged and radius $R_1$ is made smaller, a "triangular" polygonal contour is produced which has retracted, concave sides but nevertheless sharp corners. If the radial distance is reduced with respect to the above-stated setting and radius $R_1$ is made larger, "triangular" polygonal contours result which have convex sides, as shown in FIG. 11.

By varying all parameters together, as for example changing the ratio of the radii of the circular tool path and the second circular path on which rotates the axis of rotation of the tool path, or the phase position of the two crankarms with respect to one another, or by suitably selecting the transmission ratio between the rate of rotation of the chuck on the one hand and the rate of rotation of the tool on its first circular path or the rate of rotation of the tool on its second circular path, respectively, almost any desired polygonal contour can be produced.

The method according to the invention can be used not only for machining workpieces, for example in a turning process, it is also possible to perform a machining work by grinding if, instead of a rotary chisel as tool, an additionally rotating grinding element is arranged on the tool holder. A great advantage of the method according to the invention is, in particular, that all individual movements within the system occur on circular paths so that even larger masses, as given, for example, by the grinding element including the grinding spindle and the grinding drive, can be balanced without difficulty.

However, the method according to the invention is not limited to machining work. For example, workpieces having polygonal contours that have been preprocessed by turning or grinding can be subsequently worked with a rolling tool. Other surface treatment methods, for example, flame spraying, can be performed in this manner as well. Instead of the apparatus shown as preferred embodiments, other drive arrangements, particularly planet gear drives, hydraulic, electric or pneumatic arrangements can also be used with the aid of which epicycloids or hypocycloids, particularly Pascal curves and ellipses can be produced, with circular movements being superposed according to the invention.

The method can also be used to produce higher order polygonal contours if, for example, a drive mechanism is connected ahead of the above-illustrated and described devices, with such drive mechanism having a nonuniform output, i.e. in which crankshaft 13 or drive shaft 32, respectively, is driven at a nonuniform angular velocity, with such nonuniformity again occurring according to a given law of motion and the angular velocity preferably corresponding to the angular velocity of a point guided at the same circumferential velocity on an epicycloid or hypocycloid.

The method can also be used, with the appropriate modification, for a stationary workpiece, in which case the ratio of the rate of rotation of the circular tool path on the one hand to the circular path on which rotates the axis of rotation of the tool determines the number of corners. To produce polygonal contours having linear sides and sharp corners, it is then necessary to employ a drive system of the above-decribed type with nonuniform output in correspondence with one of the two circular movements, preferably the second circular path.

The apparatus shown in FIG. 12 includes a chuck 7 for the workpiece to be worked (not shown in detail here) where the chuck is in communication with a drive mechanism and rotates around the axis of rotation 4 of the tool at a given, constant angular velocity. Similarly as in a lathe, a support-like frame 8 is associated with chuck 7 and is mounted to be displaceable—with respect to machine frame G (not shown in detail here), in which axis of rotation 4 is mounted—in the direction of arrow 9 toward chuck 7 and thus toward the workpiece. A bearing 14 is disposed on this frame 8 and supports a shaft 13 which is connected with a crankarm 12. By means of a drive mechanism not shown in detail here, shaft 13 of crankarm 12 is in communication with the drive for chuck 7 so that the rate of rotation of shaft 13 is dependent on the rate of rotation of chuck 7. In the embodiment according to FIG. 12, the drive mechanism is designed in such a manner that shaft 13 rotates oppositely to chuck 7 of the workpiece. The bearings 14 of shaft 13 are held at frame 8 together with adjustment devices 15 so that the entire arrangement as a whole can be displaced radially to all sides, particularly transversely to the axis of rotation 4 of chuck 7.

Crankarm 12 is further provided with adjusting means 16 so that the crankpin which is provided in the form of a bearing sleeve 11' can be changed with respect to crank radius $R_2$. A shaft 17 whose free end is provided with a tool holder 19 to which tool 20 is fastened, is mounted in pivot bearing 11'. With the aid of an adjustment device 21, the distance of tool 20 from the axis of rotation of shaft 17, and thus radius $R_1$ of the circular path described by tool 20 with respect to shaft 17, can be changed.

To now be able to drive shaft 17 of tool holder 19 with respect to its direction of rotation, angular velocity and phase position in dependence on crankarm 12, a second crankshaft 33 is mounted in frame 8, with crankarm 34 of crankshaft 33 again being provided with an adjusting device 35 which makes it possible to set the crank radius correspondingly. Crankpin 36 at crankarm 34 is fixed to a driving gear 37 which is in engagement with a driven gear 38 that is connected with shaft 17 of tool holder 19. The first crankshaft 13 and the second crankshaft 33 are in communication with one another by means of a gear drive 18 which includes a driving gear 39 connected with crankshaft 13, a first intermediate gear 40 as well as a second intermediate gear 41, with the arrangement being such that crankshaft 13 and crankshaft 33 rotate in the same direction at the same rate of rotation.

If now driving gear 37 and driven gear 38 are given the same size and crank 36 is set in such a manner that it has the same crank radius as crank 12, namely $R_2$, tool 20 describes a hypocycloid, here in the form of an ellipse. Due to the superposition of the constant rotary movement of the workpiece held in chuck 7, a corresponding polygonal contour results if the remaining parameters are given accordingly.

The embodiment according to FIG. 13 corresponds in its configuration essentially to the embodiment of FIG. 12 so that the same components here are given the same reference numerals. The structural difference is that gear drive 18 is formed only by driving gear 39 and one intermediate gear 41 at crankshaft 33 so that the first crankshaft 13 and the second crankshaft 33 rotate in opposite directions but at the same rpm.

Driving gear 37' disposed at crankpin 36 of the second crankshaft 33 is half the size of driven gear 38' which is connected with shaft 17. Here again, both crankpins are set, by way of the adjustment devices, to describe the same crank radius $R_2$.

If now crankshaft 13 is driven in the direction of arrow 42, shaft 17 describes a circular path with radius $R_2$. Since simultaneously, shaft 17 is also driven by way of drive mechanism 18, tool 20 describes a circular path with radius $R_1$ with respect to shaft 17. In the illustrated and described gear arrangement, the superposition of these two circular movements results with respect to space, i.e. with respect to chuck 7, in an epicycloid, in the present case a Pascal curve. If the number of revolutions $n_1$ of the workpiece and the number of revolutions $n_2$ of the tool are adapted correspondingly, as results from the superposition of the two circular paths, the superposition of the rotary movement of the workpiece in chuck 7, on the one hand, and of tool 20, on the other hand, results in a polygonal contour with the corresponding number of corners, as given by the formulas. The shape of the edges between the corners, i.e. linear edges with sharply defined corners, concave edges with rounded corners, or convex edges with rounded corners, results from the corresponding setting of the remaining parameters.

With the two above-described devices, a plurality of polygonal contours can be produced, with a multitude of variations being possible due to the free adjustability of the individual parameters, for example circle radii $R_1$ and $R_2$, as well as by displacing the entire arrangement, with the aid of fixing device 15, with respect to the axis of rotation 4, i.e. setting the eccentricity e between axis of rotation 4 and the axis of rotation of shaft 17, as well as matching the rpm. By varying the various parameters with respect to one another, as for example, changing the ratio of radius $R_1$ of the circular tool path to radius $R_2$ of the circular path on which the axis of rotation of the tool circle rotates or the phase position of the two crankarms with respect to one another or by appropriate selection of the transmission ratio between the number of revolutions of the chuck, on the one hand, and the number of revolutions of the tool on its first circular path or the number of revolutions of the tool on its second circular path, on the other hand, almost any desired polygonal contour can be produced.

The arrangement is suitable not only for machining work on workpieces, for example in the form of a turning process, it is also possible, for example, to perform machining work by grinding or cutting if, instead of a rotary chisel as the tool, and additionally rotating grinding/cutting element is disposed on the tool holder. The particular advantage of the apparatus according to the invention is primarily that the individual movements within the system are performed on circular paths so that even larger masses, as encountered, for example, in grinding work in the form of the grinding element with its grinding spindle and grinding drive, can be balanced out without difficulty. Instead of working by turning and grinding, workpieces having polygonal contours, which have been preprocessed, for example, can subsequently be worked with a rolling tool or, for example, surface work or hardening by means of laser or electron beams or the like can be performed.

If hollow shafts are used, apparatus according to FIGS. 12 and 13 can likewise be used to work rod material. Kinematic reversal is possible, i.e. the workpiece describes a hypocycloid path or an epicycloid path, respectively, and the tool describes a simple circle.

As a special case, it is also possible to set radius $R_2$ at "zero" so that the tool describes a circular path. To do this, tool shaft 17 is firmly coupled to crankshaft 13 and the crankshaft is driven at the number of revolutions and in the direction of rotation with which otherwise tool shaft 17 is driven. This produces a pure epicycloid or hypocycloid, respectively, as the workpiece contour.

If the rate of rotation of the tool and of the workpiece are selected to be the same, circular or polygonal eccentrics (crankshaft) result as the workpiece contour, depending on the setting employed.

I claim:

1. Method for producing a workpiece having a selected polygonal contour, said method comprising: rotating the workpiece at a constant rate about a stationary axis; and guiding the tool along a closed, noncircular path at a circumferential speed which is dependent upon the rate of rotation of the workpiece, while maintaining the tool in engagement with the workpiece during movement of the tool over at least part of the path, wherein:

said step of guiding is carried out for varying the speed of movement of the tool along the path, during each traversal of the path, according to a law of motion determined by the selected polygonal contour and for causing the path of movement of the tool to be eccentric to, and to enclose, the stationary axis;

said step of guiding is further carried out such that the path of movement of the tool is constituted by displacement of the tool over a first circular path about a first axis simultaneously with rotation of the first axis over a second circular path about a stationary second axis; and the radii of the first and second circular paths and the phase relation between the angular position of the tool relative to the first axis and the position of the first axis relative to the second axis are selected to give the curved path a selected form.

2. Method according to claim 1, characterized in that the curved path is an epicycloid, particularly a Pascal curve.

3. Method as defined in claim 2 wherein the displacement of the tool over the first circular path about the first axis is in the same direction as, and at a lower angular velocity than, the rotation of the first axis about the second axis.

4. Method as defined in claim 3 wherein the displacement of the tool over the first circular path is at a constant angular velocity about the first axis and the rotation of the first axis about the second axis is at a constant angular velocity.

5. Method according to claim 1, characterized in that the curved path is a hypocycloid, particularly an ellipse.

6. Method as defined in claim 3 wherein the displacement of the tool over the first circular path about the first axis is in the opposite direction to, and at an angular velocity no greater than, the rotation of the first axis about the second axis.

7. Method as defined in claim 6 wherein the displacement of the tool over the first circular path is at a constant angular velocity about the first axis and the rotation of the first axis about the second axis is at a constant angular velocity.

8. Method as defined in claim 1 wherein the radius of the second circular path is smaller than the radius of the first circular path.

* * * * *